(12) United States Patent
Zandt

(10) Patent No.: US 11,534,850 B2
(45) Date of Patent: Dec. 27, 2022

(54) METHOD AND CONTROL UNIT FOR CONTROLLING A JOINING STATION

(71) Applicant: Bayerische Motoren Werke Aktiengesellschaft, Munich (DE)

(72) Inventor: Alexander Zandt, Waldkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 442 days.

(21) Appl. No.: 16/689,174

(22) Filed: Nov. 20, 2019

(65) Prior Publication Data

US 2020/0086416 A1 Mar. 19, 2020

Related U.S. Application Data

(63) Continuation of application No. PCT/EP2018/068088, filed on Jul. 4, 2018.

(30) Foreign Application Priority Data

Jul. 27, 2017 (DE) ...................... 10 2017 213 001.6

(51) Int. Cl.
*B23K 9/20* (2006.01)
*B23K 9/095* (2006.01)
*B23K 11/00* (2006.01)

(52) U.S. Cl.
CPC ............ *B23K 9/205* (2013.01); *B23K 9/0953* (2013.01); *B23K 9/0956* (2013.01); *B23K 9/202* (2013.01); *B23K 11/0053* (2013.01)

(58) Field of Classification Search
CPC .... B23K 9/205; B23K 9/0953; B23K 9/0956; B23K 9/202; B23K 11/0053
See application file for complete search history.

(56) References Cited

U.S. PATENT DOCUMENTS

| 4,130,873 A | 12/1978 | Fioretta et al. |
| 4,420,812 A | 12/1983 | Ito et al. |
| 5,643,478 A | 7/1997 | Dillet et al. |
| 2004/0149695 A1* | 8/2004 | Madsak ................ B23K 9/205 219/99 |

(Continued)

FOREIGN PATENT DOCUMENTS

| CN | 101722363 A | 6/2010 |
| CN | 102489845 A | 6/2012 |

(Continued)

OTHER PUBLICATIONS

International Search Report (PCT/ISA/210) issued in PCT Application No. PCT/EP2018/068088 dated Oct. 25, 2018 with English translation (five (5) pages).

(Continued)

*Primary Examiner* — Brian W Jennison
(74) *Attorney, Agent, or Firm* — Crowell & Moring LLP

(57) ABSTRACT

A control unit and method for a joining system having at least one joining station, which is designed to join at least one first joining element to a workpiece, determines actual data with respect to a first joining element joined to a current workpiece by the joining station. The control unit and method determine, in accordance with the actual data, a subsequent control instruction for the joining station for joining a first joining element to a subsequent workpiece.

12 Claims, 1 Drawing Sheet

(56) References Cited

U.S. PATENT DOCUMENTS

2011/0118876 A1* 5/2011 Hayama ............... B25J 9/1656
901/3

FOREIGN PATENT DOCUMENTS

| | | |
|---|---|---|
| CN | 202684296 U | 1/2013 |
| DE | 25 57 464 A | 7/1976 |
| DE | 26 24 012 A | 12/1976 |
| DE | 30 34 244 A1 | 4/1981 |
| DE | 69213 121 T2 | 3/1997 |
| DE | 198 28 986 A1 | 12/1999 |
| DE | 101 24 088 A1 | 11/2002 |
| DE | 10 2015 209 168 A1 | 11/2016 |
| WO | WO 2015/051348 A1 | 4/2015 |
| WO | WO 2015/051348 A9 | 4/2015 |

OTHER PUBLICATIONS

German-language Written Opinion (PCT/ISA/237) issued in PCT Application No. PCT/EP2018/068088 dated Oct. 25, 2018 (five (5) pages).

German-language Search Report issued in counterpart German Application No. 102017213001.6 dated Oct. 13, 2017 with partial English translation (nine (9) pages).

English translation of Chinese language Office Action issued in Chinese Application No. 201880033850.8 dated Dec. 3, 2020 with English translation (nine (9) pages).

* cited by examiner

METHOD AND CONTROL UNIT FOR CONTROLLING A JOINING STATION

CROSS REFERENCE TO RELATED APPLICATIONS

This application is a continuation of PCT International Application No. PCT/EP2018/068088, filed Jul. 4, 2018, which claims priority under 35 U.S.C. § 119 from German Patent Application No. 10 2017 213 001.6, filed Jul. 27, 2017, the entire disclosures of which are herein expressly incorporated by reference.

BACKGROUND AND SUMMARY OF THE INVENTION

The invention relates to a method and a control unit for actuating a joining station, in particular in order to join joining elements to a workpiece.

The manufacture of a manufactured product (e.g. a motor vehicle) typically involves one or more joining elements, in particular bolts, being permanently connected to a workpiece. By way of example, the production of a motor vehicle typically results in a multiplicity of bolts being attached (e.g. welded) to a substructure of the motor vehicle. This involves for the most part multiple joining stations, in particular joining robots, being employed at the same time in order to connect the respective subset of the joining elements to the workpiece.

The different positioning and/or orientation of the joining elements can lead to erroneous placement of one or more joining elements on a workpiece. The present document is concerned with the technical object of allowing precise placement of a joining element on a workpiece in an efficient manner.

The object is achieved by the independent claims. Advantageous embodiments are described in the dependent claims, inter alia. It is pointed out that additional features of a patent claim dependent on an independent patent claim, without the features of the independent patent claim or only in combination with a subset of the features of the independent patent claim, can form a separate invention that is independent of the combination of all the features of the independent patent claim and that can be made the subject matter of an independent claim, of a divisional application or of a subsequent application. This applies in the same manner to technical teachings described in the description that are able to form an invention independent of the features of the independent patent claims.

According to one aspect, a control unit for a joining system is described. The joining system can comprise at least one joining station configured to join at least one first joining element to a workpiece. In particular, the joining station may be configured to join physically identical first joining elements of a first joining element type to a multiplicity of physically identical workpieces repeatedly in a specific manner.

It is possible for setpoint data for the connection of the first joining element and a workpiece to be defined in advance. The setpoint data can indicate the setpoint position of the first joining element on a workpiece and/or the setpoint orientation of the first joining element relative to the workpiece. It is then possible for the joining system to produce a multiplicity of physically identical workpieces, each of the multiplicity of physically identical workpieces having the first joining element at a specific position and/or with a specific orientation. In this case, the specific position and/or the specific orientation should correspond to the setpoint position and/or the setpoint orientation for all of the multiplicity of physically identical workpieces.

The first joining element can comprise a bolt that is attached to a workpiece. The workpiece can be e.g. a flat workpiece. The workpiece can be part of a motor vehicle, in particular of a road motor vehicle, for example of a passenger vehicle, of a truck, of a bus and/or of a motorcycle. The joining station can comprise a joining tool, in particular a welding tool, configured to join the first joining element to a workpiece. In addition, the joining station can have a moving arm by way of which the joining tool can be taken to different positions and/or put into different orientations (e.g. in order to place different joining elements on a workpiece at different positions and/or with different orientations).

The joining system can therefore be used to gradually fit physically identical workpieces (fitted with components) with one or more joining elements in the same manner. The physically identical workpieces (fitted with components) therefore have physically identical joining elements at corresponding positions.

A joining system can have a plurality of physically identical and/or different joining stations. The use of multiple joining stations allows the number of manufactured workpieces (fitted with components) per unit time to be increased. In particular, the use of multiple joining stations allows multiple joining stations to be used in parallel and/or sequentially for a common workpiece (e.g. in order to attach respective joining elements of the same joining element type to the workpiece). The different joining stations may be associated with different joining element types, for example.

The control unit is configured to determine actual data for a first joining element joined to a current workpiece by the joining station. The control unit can e.g. capture the actual data on the basis of sensor data from one or more sensors configured to detect the first joining element joined to the current workpiece. Exemplary sensors are a photographic camera, a radar scanner and/or a laser scanner.

The actual data can indicate an actual position of the first joining element on the current workpiece. Alternatively or additionally, the actual data can indicate an actual orientation of the first joining element relative to the current workpiece. It is therefore possible (e.g. on the basis of sensor data) to determine where and/or how the first joining element was attached to the current workpiece by the joining station. This typically involved at least one current control instruction being used for actuating the joining station. In particular, typically at least one current control instruction was used for joining the first joining element to the current workpiece. The current control instruction used by the joining station may be stored on a memory unit of the control unit.

The control unit is further configured to take the actual data as a basis for determining a subsequent control instruction for the joining station for joining the first joining element (i.e. for joining a physically identical first joining element) to a subsequent (physically identical) workpiece. In particular, the control unit may be configured to customize the current control instruction that was used for joining the first joining element to the current workpiece on the basis of the actual data in order to determine the subsequent control instruction.

The control unit is therefore configured to customize the control instructions used for joining a specific joining element (i.e. for joining a joining element of a specific joining element type) during the production of a current and subsequent (physically identical) workpiece. In particular, it is possible for the control instructions to be customized (if need be continuously). As such, the quality of workpieces fitted with one or more joining elements can be increased in an efficient manner.

The control unit is typically configured to determine setpoint data for the first joining element on the current workpiece. In particular, the setpoint position and/or the setpoint orientation of the joining element can be determined. In this case, the setpoint data may be prescribed by the design of a workpiece to be produced. By way of example, the setpoint data can be obtained from a computer aided design (CAD) system and/or from a virtual vehicle. The setpoint data may be stored on a memory unit. The determining of the setpoint data can therefore comprise the accessing of a memory unit. The subsequent control instruction can then also be determined on the basis of the (prescribed) setpoint data, in particular on the basis of a deviation in the actual data from the setpoint data.

In particular, the current control instruction can be customized on the basis of the deviation between actual data and setpoint data such that the deviation is reduced, in particular minimized, when the first joining element is joined to the subsequent workpiece. If need be, (repeated) closed-loop control and/or customization of the control instruction can take place on the basis of the (repeatedly) determined deviation. It is therefore possible for precise placement of joining elements to be caused in an automatic manner.

The subsequent control instruction may be such that the subsequent control instruction influences a position at which the first joining element is positioned on the subsequent workpiece by the joining station. Alternatively or additionally, the subsequent control instruction may be such that the subsequent control instruction influences an orientation with which the first joining element is attached to the subsequent workpiece by the joining station. The subsequent control instruction can therefore cause the joining station to move such that the first joining element is attached to the subsequent workpiece at a specific position and/or with a specific orientation.

As already set out above, the joining system can comprise a plurality of joining stations that each join one or more joining elements to the current workpiece. The control unit may be configured to determine which joining station from the plurality of joining stations joined the first joining element to the current workpiece. It is then possible for the subsequent control instruction for the determined joining station to be determined. In particular, the control unit may be configured to unambiguously assign the different joining elements to be joined on a workpiece to the different joining stations. It is therefore possible for joining elements to be placed on a complex workpiece efficiently and precisely by a joining system having multiple joining stations.

A joining system can comprise Q first joining stations (e.g. Q=2 or more) of a first station type and R second joining stations (e.g. R=2 or more) of a second station type. A first joining station can attach a respective first subset of joining elements, and a second joining station can attach a respective second subset of joining elements, to a workpiece, wherein the first subset and the second subset together can result in an overall set of joining elements to be attached to the workpiece. Q and R may be different. In particular, Q and R may be dependent on the processing time of the respective joining stations for attaching the respective subsets of joining elements. Q and R may be such that the throughput of the Q first joining stations corresponds substantially to the throughput of the R second joining stations.

A workpiece to be produced can, depending on availability, be supplied to any first joining station from the Q (physically identical) first joining stations and subsequently to any second joining station from the R (physically identical) second joining stations for the purpose of fitting the components. The control unit may be configured to determine which of the Q first joining stations and which of the R second joining stations has produced a current workpiece. It is then possible for one or more subsequent control instructions for the identified first joining station and/or for the identified second joining station for producing a subsequent workpiece to be determined.

According to a further aspect, a method for actuating a joining station is described. The joining station is configured to join at least one first joining element to a workpiece. The method comprises determining actual data for a first joining element joined to a current workpiece by the joining station. Additionally, the method comprises determining a subsequent control instruction for the joining station for joining the first joining element (i.e. for joining a physically identical joining element) to a subsequent (physically identical) workpiece on the basis of the actual data.

According to a further aspect, a software (SW) program is described. The SW program can be configured to be executed on a processor and to thereby carry out the method described in this document.

According to a further aspect, a storage medium is described. The storage medium can comprise an SW program configured to be executed on a processor and to thereby carry out the method described in this document.

It should be borne in mind that the methods, apparatuses and systems described in this document can be used either alone or in combination with other methods, apparatuses and systems described in this document. In addition, any aspects of the methods, apparatuses and systems described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
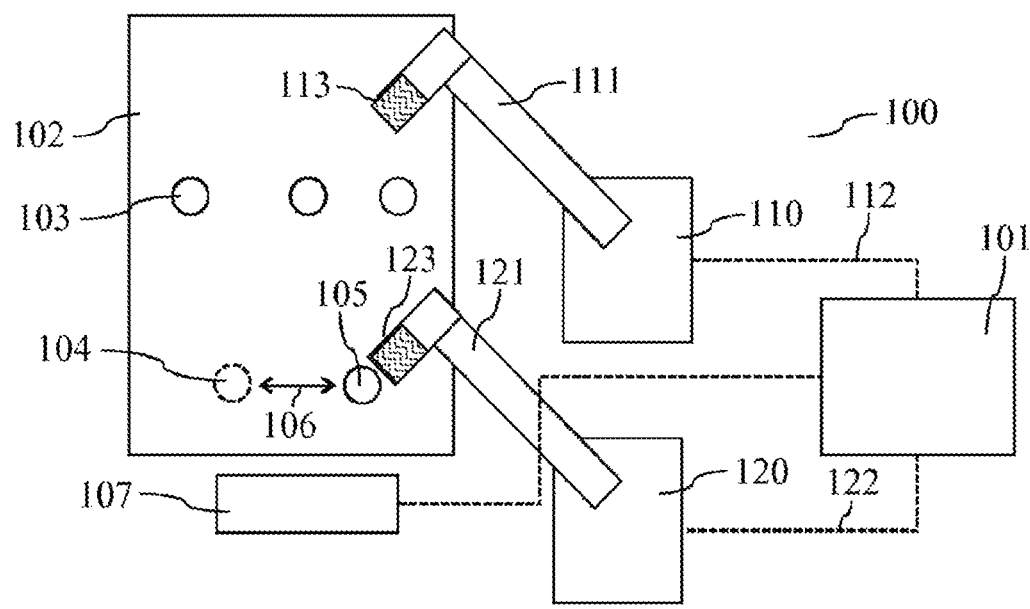
FIG. 1 shows an exemplary joining system having a plurality of joining stations.

As explained at the outset, the present document is concerned with the efficient and precise placement of joining elements (in particular of bolts) on a workpiece. In this connection, FIG. 1 shows an exemplary joining system 100 having multiple (in particular having two) joining stations 110, 120 (also referred to as a joining installation). The joining stations 110, 120 have moving arms 111, 121 (also referred to as joining robots) by means of which a joining tool 113, 123 (e.g. a welding unit) can be moved to different positions on a workpiece 102 in order to join (in particular to weld) joining elements 103 to the workpiece 102. A joining station 110, 120 can possibly have a plurality of moving arms 111, 121 having a corresponding plurality of joining tools 113, 123.

The joining stations 110, 120 can be actuated by way of a control unit 101 of the system 100. For each joining element 103 to be attached, the control unit 101 can

- access a memory in order to determine the type of joining element 103 that is supposed to be attached;
- access a memory in order to determine the setpoint data 105 for the setpoint position at which the joining element 103 is supposed to be placed on the workpiece 102 and/or for the setpoint orientation that the joining element 103 is supposed to have relative to the workpiece 102; and/or
- determine the joining station 110, 120 by which the joining element 103 is supposed to be attached to the workpiece 102.

The aforementioned joining element data may be stored in a memory unit of the control unit 101 (e.g. for a specific workpiece type). The control unit 101 can take the joining element data as a basis for generating one or more control instructions 112, 122 to the one or more joining stations 110, 120 of the system 100 in order to attach the different joining elements 103 to a specific workpiece 102. As such, physically identical workpieces 102 each having a multiplicity of joining elements 103 can be produced sequentially. By way of example, several hundred joining elements 103 (in particular bolts) can be attached to the substructure of a road motor vehicle.

The system 100 can comprise at least one sensor 107 (in particular a photographic sensor and/or a radar sensor) configured to capture sensor data for a joining element 103 attached to a workpiece 102. By way of example, the sensor data can comprise image data indicating the position and/or the orientation of the joining element 103 on the workpiece 102. The control unit 101 may be configured to take the sensor data as a basis for determining actual data 104 for the actual position and/or the actual orientation of a joining element 103 on a current workpiece 102. The control unit 101 may further be configured to determine the setpoint data 105 for this joining element 103, in particular by accessing a data memory. Additionally, a deviation 106 between the setpoint data 105 and actual data 104 can be determined computationally.

The determined deviation 106 can be used to customize the actuation of the one or more joining stations 110, 120 when a subsequent (physical identical) workpiece 102 is produced. If a substantial deviation 106 between the actual data 104 and the setpoint data 105 for an exemplary first joining element 103 has been identified for the production of a current workpiece 102, then the control unit 101 can determine which joining station 110, 120 has attached the first joining element 103 to the current workpiece 102. In addition, the control instructions 112, 122 for the identified joining station 110, 120 can be customized for the production of a subsequent workpiece 102, so that the (physically identical) first joining element 103 is placed (i.e. positioned and/or oriented) on the (physically identical) subsequent workpiece 102 correctly.

In an exemplary fashion, several hundred bolts 103 can be welded to a substructure 102 of a vehicle of a specific vehicle type at different positions and/or with different orientations. In this case, a substructure typically passes through a specific combination of bolt stations 110, 120. Following the fixing of the bolts 103, the bolts 103 can be scanned at a measurement cell or sensor 107 (e.g. at a laser radar). This allows workpieces 102 to be selected at random if need be and each to be 100% measured if need be.

When determining the actual data 104 of a bolt 103, it is first of all possible for the orientation of the surface of the workpiece 102 to be determined. In addition, the position of the cylinder geometry of the bolt 103 can be determined. It is then possible to determine a point of intersection between the surface of the workpiece 102 and the cylinder axis of the bolt 103 as the actual position of the bolt 103. The difference between actual position and setpoint position results in a deviation 106. The digression or a back-calculation of the surface deviation can then be used to determine a correction value for the actuation of a station 110, 120 for consolidating a subsequent workpiece 102.

The one or more control instructions 112, 122 for a joining station 110, 120 for joining a first joining element 103 can be corrected on the basis of the determined deviation or on the basis of the determined correction value. The one or more corrected control instructions 112, 122 can then be used for joining the first joining element 103 for a subsequent workpiece 102. As such, precise placement of joining elements 103 can be caused in an efficient manner.

Figure 2:
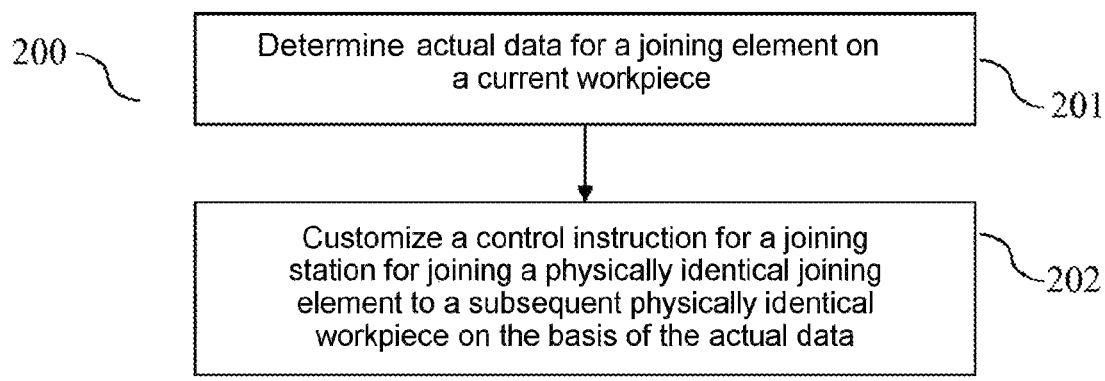
FIG. 2 shows a flowchart for an exemplary method for actuating a joining system as part of a joining process.

FIG. 2 shows a flowchart for an exemplary (computer-implemented) method 200 for actuating a joining station 110, 120. The joining station 110, 120 is configured to join at least one first joining element 103 or a joining element 103 of a first joining element type to a workpiece 102. The method 200 comprises determining 201 actual data 104 for a first joining element 103 joined to a current workpiece 102 by the joining station 110, 120. In particular, the actual position and/or the actual orientation can be determined (e.g. on the basis of sensor data from one or more sensors 107).

The method 200 further comprises determining 202 a subsequent control instruction 112, 122 for the joining station 110, 120 for joining the first joining element 103 (i.e. for joining a joining element 103 of the first joining element type) to a subsequent workpiece 102 on the basis of the actual data 104. In particular, the control instruction 112, 122 used for joining the first joining element 103 (i.e. for joining the joining element 103 of the first joining element type) to the current workpiece 102 can be customized on the basis of the actual data 104 (and if need be on the basis of setpoint data 105).

The measures described in this document allow physically identical workpieces 102 having a multiplicity of joining elements 103 to be produced in a reliable, fast and precise manner. In addition, the measures described allow a joining system 100 to be calibrated in an automatic manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A joining system, comprising:
   a joining station configured to join joining elements of a first type to a workpiece;
   a control unit configured to:
   determine actual position data of a first joining element of the first type, which first joining element has been joined to the workpiece by the joining station; and
   generate a control instruction based on the actual position data, wherein the control instruction causes the joining station to join a second joining element of the first type to a subsequent workpiece.

2. The joining system of claim 1, further comprising:
a memory, configured to retrievably store setpoint data for joining the joining elements to the workpiece,
wherein the control unit is further configured to:
retrieve the setpoint data; and
generate the control instruction so as to be further based the setpoint data.

3. The joining system of claim 2, wherein the control instruction is generated based on a deviation between the actual position data and the setpoint data.

4. The joining system of claim 2, wherein the control unit is further configured to:
determine a prior control instruction used to join the first joining element to the workpiece; and
determine the control instruction by customizing the prior control instruction based on the actual position data.

5. The joining system of claim 1, further comprising:
a sensor, comprising one or more of: a photographic camera, a radar scanner, and a laser scanner,
wherein the control unit is further configured to determine the actual position data based on sensor data from the sensor detecting the first joining element joined to the workpiece.

6. The joining system of claim 1, wherein the actual position data indicates one or more of:
an actual location of the first joining element on the workpiece; and
an actual orientation of the first joining element relative to the workpiece.

7. The joining system of claim 1, wherein the control instruction influences one or more of:
a location at which the second joining element is joined to the subsequent workpiece by the joining station; and
an orientation with which the second joining element is joined to the subsequent workpiece by the joining station.

8. The joining system of claim 1,
wherein the joining system further comprises: a plurality of joining stations, each joining station configured to join joining elements to the workpiece,
wherein the control unit is further configured to determine that the joining station, from among the plurality of joining stations, joined the first joining element to the workpiece, and
wherein the control instruction is further based on the determination that the joining station joined the first joining element to the workpiece.

9. The joining system of claim 1, wherein one or more of:
the first joining element comprises a bolt; and
the joining station comprises a joining tool configured to join the first joining element to the workpiece.

10. The joining system of claim 9, wherein the joining tool is a welding tool.

11. The joining system of claim 1, wherein
the workpiece and the subsequent workpiece are of a same design; and
the workpiece and the subsequent workpiece are part of a road motor vehicle.

12. A method comprising:
determining actual position data of a first joining element of a first type, which first joining element has been joined to a workpiece by a joining station; and
generate a control instruction based on the actual position data, wherein the control instruction causes the joining station to join a second joining element of the first type to a subsequent workpiece.

* * * * *